Oct. 7, 1952     E. H. OSTERLAND     2,613,345
VOLTAGE DIVIDER
Filed June 5, 1946
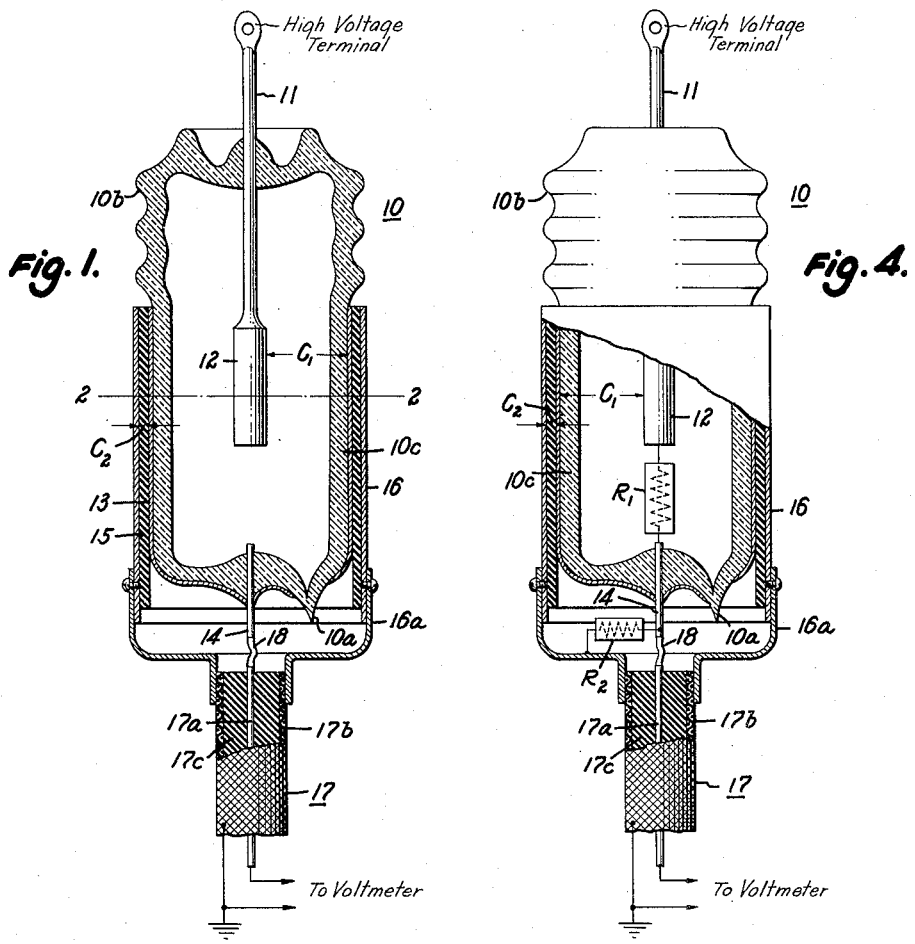
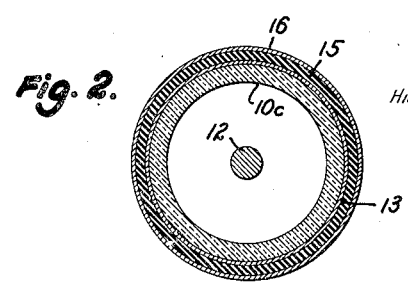
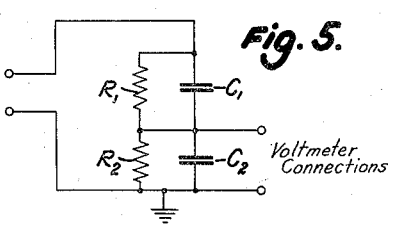
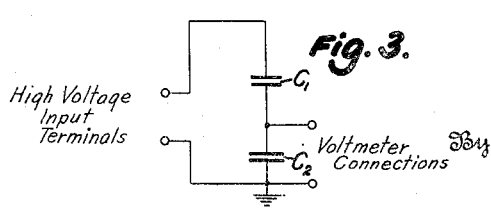
Inventor:
Edmund H. Osterland,
Pierce + Scheffler,
Attorneys.

Patented Oct. 7, 1952

2,613,345

UNITED STATES PATENT OFFICE 2,613,345

VOLTAGE DIVIDER

Edmund H. Osterland, Parsippany, N. J.

Application June 5, 1946, Serial No. 674,606

5 Claims. (Cl. 323—79)

This invention relates to alternating current voltage dividers and in particular to those of the capacitor type. Such dividers are often referred to as meter multipliers.

The general object of the invention is to provide an improved voltage divider of the capacitor type that will produce a step-down from a high voltage, high frequency source in sufficient degree to permit the input voltage to be most accurately measured by means of an ordinary vacuum tube voltmeter or other high input impedance voltmeter.

A specific object is to provide a capacitor type voltage divider in which the effect of stray capacitances is reduced to a negligible factor, thereby resulting in a higher degree of measuring accuracy and permitting use of a much smaller capacitor unit in the divider than heretofore possible, thus keeping the circuit loading to a minimum.

Another object is to provide a capacitor type voltage divider which offers a stepup of impedance with respect to the output terminals so that the measuring device imposes a smaller load upon the source being measured.

Yet another object is to provide a meter multiplier for use in measuring high voltages featuring short input connections but which at the same time permits the voltmeter instrument itself to be located at a safe distance from the voltage source being measured.

The foregoing and other objects and advantages of the invention will become more apparent from the following detailed description and from the accompanying drawings in which:

Fig. 1 is a view in vertical section of a preferred construction according to the invention;

Fig. 2 is a transverse section taken on lines 2—2 of Fig. 1;

Fig. 3 is an electrical schematic showing the circuit of the capacitor arrangement in Fig. 1;

Fig. 4 is a vertical view of a modified construction, partly in section and partly in elevation; and Fig. 5 is also an electrical schematic showing the circuit arrangement of the resistor and capacitor components in the Fig. 4 embodiment.

Referring now to the drawings and in particular to Fig. 1, the improved construction according to this invention features a tubular envelope 10 of dielectric material, preferably of glass. As shown in the drawing, envelope 10 should be evacuated such as by conventional vacuum pump apparatus through tip 10a when the voltage divider is intended for use where conditions require comparatively low input capacity and a high break-down protection in a small space. However, in some cases, envelope 10 may be filled with a substance such as transformer oil in order to increase the dielectric constant and hence the input capacity.

The upper portion 10b of the envelope 10 is corrugated to increase the leakage path while the lower portion 10c is shaped as a cylinder. Projecting into the envelope through the upper end is an electrically conductive rod 11. This rod may be constructed of tungsten or "Kovar" or other metal which seals well to the particular grade of glass used, and which rod is fairly rigid and strong. The latter is positioned along the longitudinal axis of the envelope and its lower end is enlarged to form a cylindrical electrode member 12 which is disposed within the cylindrical portion 10c of the envelope. The upper end of rod 11 serves as the high voltage connecting point. The outer surface of electrode 12 forms one plate of a capacitor $C_1$. The other plate of capacitor $C_1$ is formed by a layer of electrically conductive material 13 which covers the cylindrical and bottom portions of envelope 10. The conductive layer 13 is preferably in the form of a coating which can be applied by dipping, spraying or brushing and, preferably, the coating is baked to insure stability. Pyro-chemically deposited silver or colloidal carbon solutions may be used with equivalent results for this purpose. A conductive lead 14 secured by and projecting through the bottom wall of envelope 10 contacts coating 13 to provide an electrical connection thereto.

A layer of insulation such as sleeve 15 made from a material having a high quality insulation characteristic as, for example, "Bakelite" or polystyrene tubing overlies and fits snugly on conductive coating 13, and a metallic layer such as a sleeve 16 which may be of brass overlies and is similarly fitted on the insulating sleeve 15. When separate insulating or conducting sleeves are used, the assembly can be secured in place by means of a suitable cement such as "Duco." It is also possible, of course, to form either or both these layers by the use of liquid deposits which harden to form the desired coat. Sleeve 16 together with the flexible metallic shield 17b of cable 17 constitutes one plate of another capacitor $C_2$. The other plate of the latter capacitor is constituted by the outer surface of conductive coating 13 while the insulating sleeve 15 and the insulation 17c of cable 17 serve as the major portions of the dielectric element of this capacitor.

The bottom portion of the outer metallic sleeve 16 may be necked or, as shown, fitted with a reducing collar or bushing 16a to provide both a mechanical and electrical connection between sleeve 16 and the flexible shielded cable 17. Conductor 17a of the cable 17 is electrically connected to the coating 13 by means of a flexible lead 18 which is soldered or welded between the adjacent ends of conductor 17a and lead 14. The shield member 17b of cable 17 is electrically and mechanically connected by soldering to the collar 16a attached to metallic sleeve 16. Assuming one side of the voltage source to be measured to be electrically grounded, sleeve 16 would likewise be grounded through shield 17b as indicated on the drawing. Connection to the vacuum tube or other high input impedance voltmeter is made to the shield 17b and conductor 17a as indicated.

The conductive coating 13, insulator sleeve 15 and outer metallic sleeve 16 extend to the junction between the corrugated and cylindrical portions of envelope 10. The outer metallic sleeve 16 provides electrostatic shielding of the essential operating portion of the voltage divider and thereby reduces the possibility of stray capacity pickup to the conductive coating 13.

Referring now to the schematic diagram in Fig. 3, it will be seen that capacitors $C_1$ and $C_2$ are arranged in series, and that the voltmeter connections are tapped across the plates of capacitor $C_2$. If desirable, the capacitance of capacitor $C_2$ may be altered for fine adjustment of the percentage of step-down in voltage by connecting externally mounted capacitors of standard design in parallel therewith in the usual manner.

If the input voltage to be measured contains low and medium audio frequency components in addition to the higher frequencies, resistors should be connected in parallel with the capacitors $C_1$, $C_2$. Such an arrangement is shown in the modified construction illustrated in Fig. 4. Except for the resistors, the Fig. 4 structure is like that of Fig. 1 and hence like reference numerals have been used to designate corresponding parts in the two views. In the modified construction, a resistor $R_1$ is connected between electrode 12 and lead 14, and a second resistor $R_2$ is connected between lead 14 and the grounded metallic sleeve 16.

As shown in Fig. 5, the modified voltage divider according to Fig. 4 comprises capacitors $C_1$ and $C_2$ connected in series across the high voltage input terminals, and resistors $R_1$ and $R_2$ connected in parallel with capacitors $C_1$ and $C_2$, respectively. Like the Fig. 1 arrangement the voltmeter is adapted to be connected across the plates of capacitor $C_2$.

In both the Fig. 1 and Fig. 4 constructions, the physical dimensions of the voltage divider and the electrical values of the capacitors and resistors used will be dependent upon the voltage with which the device is intended to be used and the desired voltage step-down ratio. In the illustrated embodiments of the voltage divider, the drawings are to scale and are somewhat smaller than full size for use on a ten thousand volt source. The capacitance of capacitor $C_1$ for such a divider would be from 1–3 $\mu\mu f$, and the capacitance of capacitor $C_2$ would vary dependent upon the desired range. Thus for a step-down ratio of 10 to 1, and assuming $C_1$ to have a capacitance of 2 $\mu\mu f$, $C_2$ would be 20 $\mu\mu f$; for a step-down ratio of 100 to 1, $C_2$ would have a value of 200 $\mu\mu f$, etc. These values of $C_2$ do not take into account the capacitive loading due to the particular voltmeter used. In practice, of course, the voltmeter input capacity is subtracted from the ideal values indicated here to produce the actual magnitude of $C_2$.

If the construction is as shown in Fig. 4 in which resistors $R_1$ and $R_2$ are used, the ratio of $R_1$ and $R_2$ should be the same as the capacity between $C_1$ and $C_2$.

In conclusion, it will of course be understood that while preferred embodiments of the invention have been illustrated in the drawings, various changes in the arrangement of parts may be made without departing from the spirit and scope of the invention as defined in the appended claims.

I claim:

1. A voltage divider of the capacity type comprising an envelope of dielectric material, an electrode supported within said envelope, voltage input terminal means connected to said electrode, a first conductive layer on the exterior surface of said envelope forming with said electrode the plates of a first capacitor, a layer of dielectric material overlying said first conductive layer, and a second conductive layer overlying said dielectric layer and substantially the entire surface area of said first conductive layer to constitute a shield for the layer against stray electrostatic fields, said first and second conductive layers forming the plates of a second capacitor constituting a measuring output adapted for connection to a high impedance voltmeter.

2. A voltage divider of the capacity type comprising an envelope of dielectric material, an electrode supported within said envelope, a voltage input terminal extending from said electrode through said envelope, a conductive coating on the exterior surface of said envelope forming with said electrode the plates of a first capacitor, a sleeve of dielectric material overlying said conductive coating and a metallic sleeve overlying both said dielectric sleeve and substantially the entire surface area of said conductive coating to constitute a shield for the latter against stray electrostatic fields, said coating and metallic sleeve forming the plates of a second capacitor and constituting a measuring output adapted for connection to a high impedance voltmeter.

3. A voltage divider of the capacity type comprising an envelope of dielectric material, said envelope having an upper corrugated portion and a lower cylindrical portion, a cylindrical electrode supported centrally within said envelope at the cylindrical portion thereof, a voltage input terminal extending from said electrode through said envelope, a conductive coating on the exterior cylindrical surface portion of said envelope forming with said electrode the plates of a first capacitor, a sleeve of dielectric material overlying said conductive coating, and a metallic sleeve overlying both said dielectric sleeve and substantially the entire surface area of said conductive coating to constitute a shield for the latter against stray electrostatic fields, said coating and metallic sleeve forming the plates of a second capacitor and constituting a measuring output adapted for connection to a high impedance voltmeter.

4. A voltage divider of the capacity type comprising an envelope of dielectric material, said envelope having upper corrugated and lower cylindrical surface portions, a voltage input terminal rod extending into said envelope at its upper end, a cylindrical electrode at the lower end of said rod and disposed at the cylindrical portion of said envelope, a conductive coating on the exterior cylindrical surface portion of said envelope forming with said electrode the plates of a first capacitor, a sleeve of dielectric material overlying said conductive coating, and a metallic sleeve overlying both said dielectric sleeve and substantially the entire surface area of said conductive coating to constitute a shield for the latter against stray electrostatic fields, said coating and metallic sleeve forming the plates of a second capacitor and constituting a measuring output adapted for connection to a high impedance voltmeter.

5. A voltage divider of the capacity type comprising an envelope of dielectric material, said envelope having upper corrugated and lower cylindrical surface portions, a voltage input terminal rod extending centrally into said envelope through the upper end thereof, a cylindrical electrode at the lower end of said rod and disposed within the cylindrical portion of said envelope, a conductive coating on the exterior surface portion of said envelope forming with said electrode the plates of a first capacitor, a sleeve of dielectric material overlying said conductive coating, a metallic sleeve overlying both said dielectric sleeve and substantially the entire surface area of said conductive coating to constitute a shield for the latter against stray electrostatic fields, said metallic sleeve being necked at the lower end of said envelope, and a shielded voltmeter connection cable fitted to the necked portion of said metallic sleeve, the shield member on said cable being electrically connected with said metallic sleeve and the conductor member thereof being electrically connected with said conductive coating, said conductive coating and conductive member of said able forming one plate of a second capacitor, the other plate of which is constituted by said metallic sleeve and shield member of said cable.

EDMUND H. OSTERLAND.

REFERENCES CITED

The following references are of record in the file of this patent:

UNITED STATES PATENTS

| Number | Name | Date |
|---|---|---|
| 1,590,420 | Chubb | June 29, 1926 |
| 1,610,980 | Silberman | Dec. 14, 1926 |
| 1,796,254 | Nyman | Mar. 10, 1931 |
| 1,934,475 | Bailey | Nov. 7, 1933 |
| 1,995,839 | Buschbeck | Mar. 26, 1935 |
| 2,046,450 | Fausett | July 7, 1936 |
| 2,135,338 | Higgins | Nov. 1, 1938 |
| 2,161,888 | Rearick | June 13, 1939 |
| 2,330,822 | Fischer | Oct. 5, 1943 |